United States Patent
Swales et al.

(10) Patent No.: US 9,145,935 B2
(45) Date of Patent: Sep. 29, 2015

(54) BRAKE MECHANISM FOR A HYBRID TRANSMISSION

(71) Applicant: GM GLOBAL TECHNOLOGY OPERATIONS LLC, Detroit, MI (US)

(72) Inventors: Shawn H. Swales, Canton, MI (US); Anthony J. Corsetti, Rochester Hills, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/058,652

(22) Filed: Oct. 21, 2013

(65) Prior Publication Data

US 2014/0128220 A1    May 8, 2014

Related U.S. Application Data

(60) Provisional application No. 61/722,479, filed on Nov. 5, 2012.

(51) Int. Cl.
| | |
|---|---|
| *F16D 63/00* | (2006.01) |
| *B60K 6/48* | (2007.10) |
| *B60K 6/547* | (2007.10) |
| *B60K 6/445* | (2007.10) |
| *F16D 27/118* | (2006.01) |
| *B60K 6/38* | (2007.10) |
| *F16D 121/20* | (2012.01) |

(52) U.S. Cl.
CPC ............... *F16D 63/00* (2013.01); *B60K 6/445* (2013.01); *B60K 6/48* (2013.01); *B60K 6/547* (2013.01); *F16D 63/006* (2013.01); *B60K 2006/381* (2013.01); *B60K 2006/4816* (2013.01); *B60Y 2400/421* (2013.01); *F16D 27/118* (2013.01); *F16D 2121/20* (2013.01); *Y02T 10/6256* (2013.01); *Y10T 477/644* (2015.01)

(58) Field of Classification Search
None
See application file for complete search history.

(56) References Cited

U.S. PATENT DOCUMENTS

| | | | | | |
|---|---|---|---|---|---|
| 3,091,316 | A | * | 5/1963 | Huffman | 192/150 |
| 3,240,304 | A | * | 3/1966 | Wickersham | 192/56.42 |
| 3,586,145 | A | * | 6/1971 | Cunningham et al. | 192/84.96 |
| 3,917,042 | A | * | 11/1975 | Summa | 192/84.92 |
| 4,498,066 | A | * | 2/1985 | Fujiwara et al. | 335/281 |
| 4,561,520 | A | * | 12/1985 | Fogelberg | 180/247 |
| 6,483,217 | B1 | * | 11/2002 | Roth-Stielow et al. | 310/93 |
| 8,540,605 | B2 | * | 9/2013 | Marur | 477/99 |
| 8,663,061 | B2 | * | 3/2014 | Yun | 477/5 |
| 2006/0278480 | A1 | * | 12/2006 | Pardee | 188/218 XL |

* cited by examiner

*Primary Examiner* — Justin Holmes
(74) *Attorney, Agent, or Firm* — Quinn Law Group, PLLC (57) ABSTRACT

A brake mechanism for a hybrid transmission includes a magnetic unit and a brake plate. The magnetic unit is configured to selectively generate magnetic flux. The magnetic unit radially surrounds an axis of rotation. The magnetic unit defines a plurality of grooves. The brake plate radially surrounds the axis of rotation and includes a plurality of teeth. The brake plate is movable axially along the axis of rotation between a disengaged position and an engaged position. The brake plate is configured to rotate about the axis of rotation, relative to the magnetic unit when in the disengaged position. The teeth of the brake plate are configured to engage the corresponding grooves of the magnetic unit when in the engaged position in response to generation of magnetic flux by the magnetic unit, such that rotation of the brake plate is ceased.

20 Claims, 9 Drawing Sheets

BRAKE MECHANISM FOR A HYBRID TRANSMISSION

CROSS-REFERENCE TO RELATED APPLICATIONS

This application claims priority to U.S. Provisional Patent Application No. 61/722,479, filed on Nov. 5, 2012, which is hereby incorporated by reference in its entirety.

TECHNICAL FIELD

The present disclosure relates to a brake mechanism for a hybrid transmission.

BACKGROUND

To produce a more efficient vehicle, hybrid vehicle powertrains combine an electric motor and a conventional internal combustion engine. Torque from the engine and the electric motor is typically channeled to the vehicle's driven wheels via a transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor/generators and no internal combustion engine.

In either a hybrid or purely electric powertrain, the electric motors are operatively connected to a transmission which includes planetary gearing such that torque and speed of the electric motors may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motors, and, in the case of the hybrid powertrain, may similarly provide a selectable torque contribution from the engine to drive the subject vehicle.

SUMMARY

A brake mechanism for a hybrid transmission includes a magnetic unit and a brake plate. The magnetic unit is configured to selectively generate magnetic flux. The magnetic unit radially surrounds an axis of rotation. The magnetic unit defines at least one groove. The brake plate radially surrounds the axis of rotation. The brake plate includes at least one tooth. The brake plate is movable axially along the axis of rotation between a disengaged position and an engaged position. The brake plate is configured to rotate about the axis of rotation, relative to the magnetic unit when in the disengaged position. The at least one tooth of the brake plate is configured to engage the corresponding at least one groove of the magnetic unit when in the engaged position in response to generation of magnetic flux by the magnetic unit to cease rotation of the brake plate.

A hybrid transmission includes an input shaft, at least one electric motor/generator, a gear set, and a brake mechanism. The gear set is rotatable about the axis of rotation. The brake mechanism includes a magnetic unit and a brake plate. The magnetic unit is configured to selectively generate magnetic flux. The magnetic unit radially surrounds the axis of rotation. The magnetic unit defines at least one groove. The brake plate radially surrounds the axis of rotation. The brake plate includes at least one tooth. The brake plate is movable axially along the axis of rotation between a disengaged position and an engaged position. The brake plate is configured to rotate about the axis of rotation, relative to the magnetic unit when in the disengaged position. The at least one tooth of the brake plate is configured to engage the corresponding at least one groove of the magnetic unit when in the engaged position in response to generation of magnetic flux by the magnetic unit to cease rotation of the brake plate.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
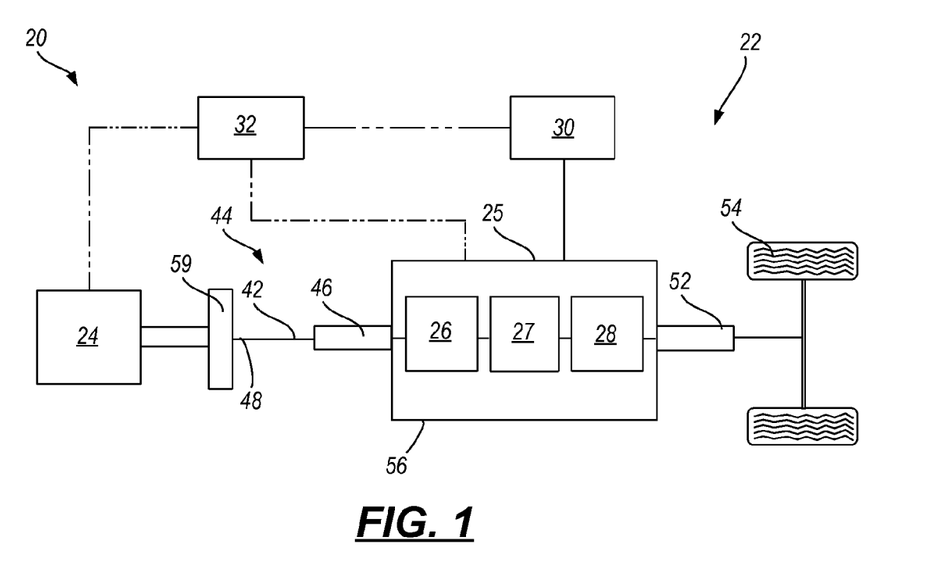
FIG. 1 is a schematic illustration of a vehicle having a hybrid transmission and a controller which controls a brake mechanism within the hybrid transmission.

Referring to the drawings, wherein like reference numbers refer to like components, FIG. 1 illustrates a hybrid powertrain 20 configured to launch and propel a vehicle 22, i.e., to operate the vehicle 22 in all speed ranges between low and high road speeds. The hybrid powertrain 20 may include multiple power sources, which include an internal combustion engine 24 and a hybrid transmission 25. The hybrid transmission 25 may include first and second motor/generators 26, 28 and an "electrically variable transmission" (EVT) 27.

The powertrain 20 additionally has an energy storage system 30 that includes one or more batteries that are not specifically shown, but known by those skilled in the art. The energy storage system 30 is operatively connected to the first and second motor/generators 26, 28 such that the motor/generators 26, 28 may transfer torque to or receive torque from the engine 24. It should be appreciated that there may be more or less than two motor/generators 26, 28. The powertrain 20 also includes a controller 32 or an electronic control unit (ECU). The controller 32 is operatively connected to the power sources and to the energy storage system 30 to control the distribution of torque from the power sources to the EVT 27.

The EVT 27 includes a transmission planetary gear train operatively connected to each of the engine 24 and the motor/generators 26, 28. Channeling respective torques of the engine 24 and the motor/generators 26, 28 to different members of the planetary gear train permits one of the power sources to either assist or balance the operation of any of the other two. Thus, the combination of one engine 24 and the motor/generators 26, 28 operatively connected to the EVT 27 allows speeds and torques of the engine 24 and the motor/generators 26, 28 to be controlled and selected independently in order to power the vehicle 22 more efficiently.

Although the hybrid powertrain 20 shown in FIG. 1 includes the engine 24 the EVT 27 may also be connectable solely to the motor/generators 26, 28. In such a case, the powertrain 20 would no longer be a hybrid type, but would become purely electric, and the EVT 27 may then be broadly described as an electro-mechanical drive unit. For simplicity and clarity, the remainder of the present description will refer to the electro-mechanical drive unit as the EVT 27 being connected to the engine 24 as well as to the motor/generators 26, 28.

Referring to FIG. 1, the EVT 27 may include one or more planetary gear sets (not shown). Each planetary gear set may be an individual planetary gear set, a compound planetary gear arrangement having two or more interconnected planetary gear sets 34, or an external gear set. The engine 24 the motor/generators 26, 28, and the gear set 34 may be disposed on an axis of rotation 42.

Referring again to FIG. 1, the engine 24 and the motor/generators 26, 28 are operatively connected to the EVT 27 via an input arrangement 44 which transmits torque from the engine 24 to a transmission input member 46. The input arrangement 44 includes an output shaft 48 of the engine 24 which also serves as the input member 46 to the transmission.

Figure 2:
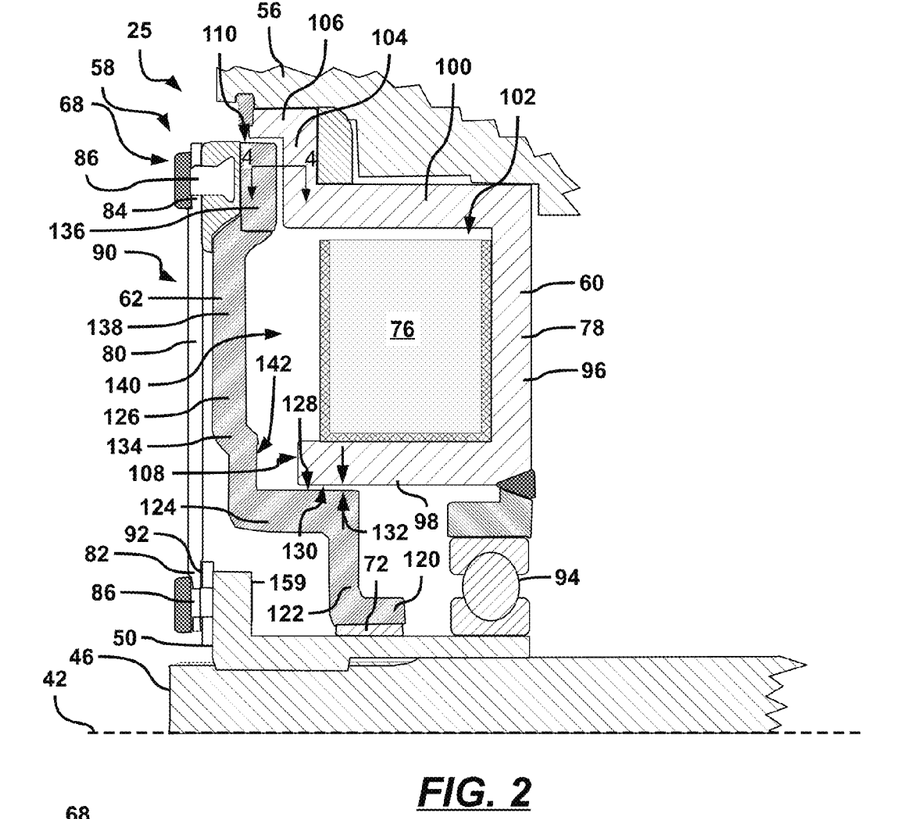
FIG. 2 is a schematic cross-sectional side view of the brake mechanism disposed in the hybrid transmission, with the brake mechanism in a disengaged position, taken along line 2-2 of FIG. 4.
Figure 4:
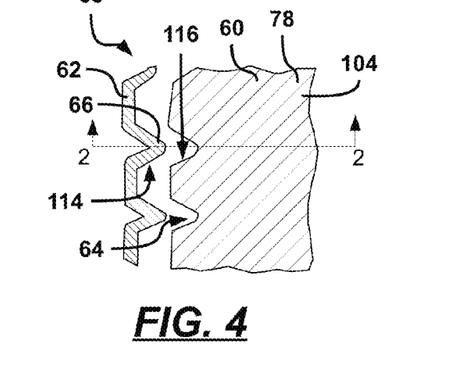
FIG. 4 is a schematic sectional view of the brake mechanism of FIG. 2 in the disengaged position, taken along line 4-4, illustrating teeth of a braking plate disengaged from grooves of a core section.

The input member 46 is disposed on, and is rotatable about, the axis of rotation 42 in order to provide engine 24 torque to the EVT 27. Referring to FIGS. 2 and 4, a hub 50 may be radially disposed on the input member 46. Referring again to FIG. 1, the hub 50 may be splined to the input member 46 such that the hub 50 rotates about the axis of rotation 42 with the input member 46. The EVT 27 also includes a transmission output member 52, disposed on the axis of rotation 42. The transmission output member 52 is continuously connected to a set of drive wheels 54 and is configured to provide output torque received from the EVT 27 to the drive wheels 54 to launch and propel the vehicle 22.

As seen in FIG. 1, the transmission 25 also includes a stationary member, such as a transmission case or housing 56. The EVT 27 may also include an electrically actuated brake mechanism 58, as shown in FIGS. 2-5 and explained in more detail below. Accordingly, the brake mechanism 58 may be used to stop rotation of the planetary gear set about the axis of rotation 42, relative to the housing 56. Referring to FIGS. 2, 3, and 6-11, the brake mechanism 58 is operatively attached to the input member 46.

As shown in FIG. 1, the EVT 27 may also include a damper 59. The damper 59 may be operatively connected to the engine 24 and is configured to absorb torsional vibrations generated by the engine 24 before such vibrations are transmitted to the planetary gear set 34 via the input member 46.

As shown in FIGS. 2-5, the brake mechanism 58 is configured to operate as an electromagnetic dog clutch which is disposed on the axis of rotation 42. The brake mechanism 58 includes a magnetic unit 60 and a brake plate 62. The magnetic unit 60 is configured to generate a magnetic flux in response to receiving a signal from the controller 32. The magnetic unit 60 is fixed to the housing 56 while also radially surrounding the axis of rotation 42. Therefore, by virtue of the attachment of the magnetic unit 60 to the housing 56, the magnetic unit 60 does not rotate about the axis of rotation 42. A plurality of evenly spaced grooves 64 are defined in the magnetic unit 60. The grooves 64 circumferentially surround the axis of rotation 42.

The brake plate 62 is generally circular and is attached to the input member 46 to radially surround the axis of rotation 42. Therefore, the brake plate 62 rotates with the input member 46 about the axis of rotation 42. The brake plate 62 includes a plurality of evenly spaced teeth 66, circumferentially surrounding the axis of rotation 42. The teeth 66 extend in generally parallel relationship to the axis of rotation 42. Further, the teeth 66 and the grooves 64 are each radially spaced from one another, all at an equal distance from the axis of rotation 42.

Figure 3:
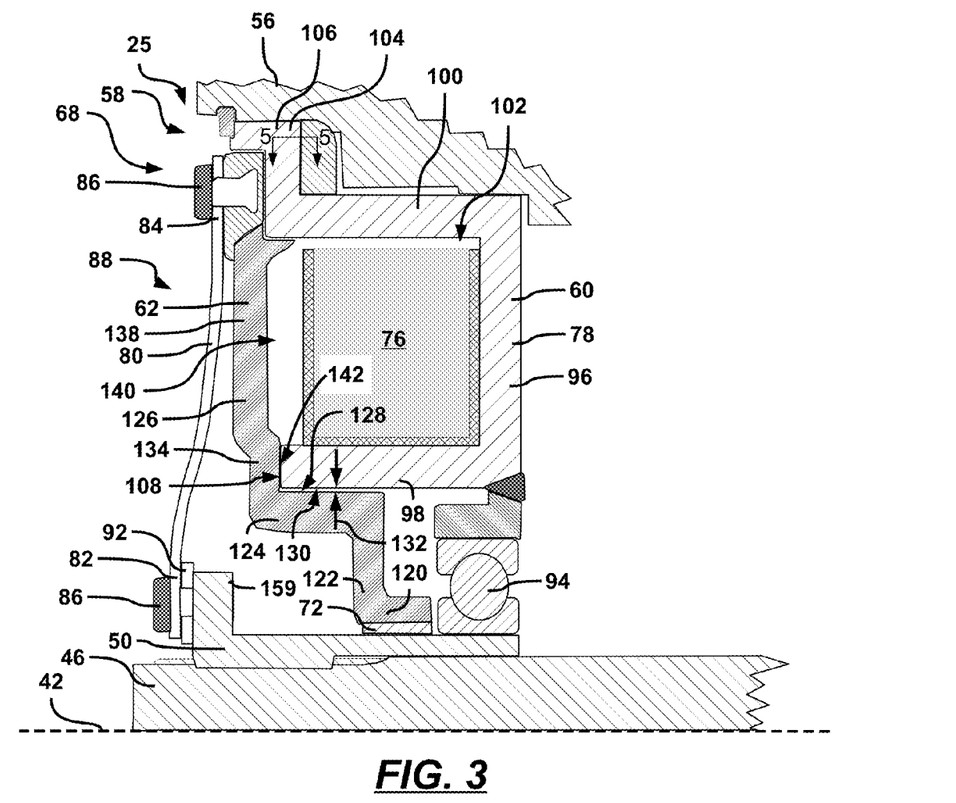
FIG. 3 is a schematic cross-sectional side view of the brake mechanism disposed in the hybrid transmission, with the brake mechanism in an engaged position, taken along line 3-3 of FIG. 5.
Figure 5:
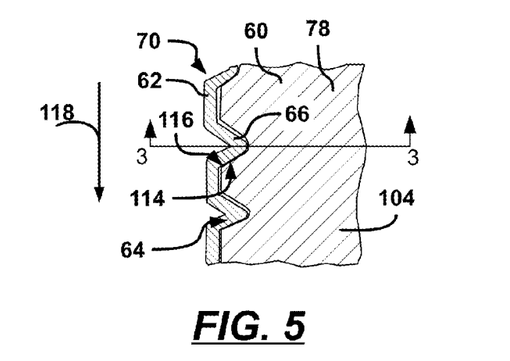
FIG. 5 is a schematic sectional view of the brake mechanism of FIG. 3 in the engaged position, taken along line 5-5, illustrating teeth of the braking plate in engagement with the grooves of the core section.

The brake plate 62 is movable axially along the axis of rotation 42 between a disengaged position 68, as shown in FIGS. 2 and 4, and an engaged position 70, as shown in FIGS. 3 and 5. A bushing 72 may be radially disposed between the brake plate 62 and the hub 50 to facilitate the axial movement. The bushing 72 may be a non-ferrous slider bushing 72 which provides a small air gap between the bushing 72 and the hub 50. When the brake plate 62 is in the disengaged position 68, as shown in FIGS. 2 and 4, the brake plate 62, along with the hub 50 and the input member 46, are allowed to rotate about the axis of rotation 42 in response to the application of torque to the input member 46. Likewise, referring to FIGS. 3 and 5, when the brake plate 62 is in the engaged position 70, the brake plate 62, along with the hub 50 and the input member 46, are prevented from rotating about the axis of rotation 42, by virtue of the engagement of the teeth 66 of the brake plate 62 with the grooves 64 of the magnetic unit 60. More specifically, in response to the generation of magnetic flux by the magnetic unit 60, the brake plate 62 moves axially along the axis of rotation 42, to the engaged position 70, such that the teeth 66 are in engagement with the corresponding grooves 64 of the magnetic unit 60. Therefore, the brake plate 62 moves relative to the hub 50 and the input member 46, axially along the axis of rotation 42. When the brake plate 62 is in the engaged position 70, the teeth 66 are radially aligned with the corresponding grooves 64 such that the teeth 66 are in engagement with the grooves 64. Therefore, since the magnetic unit 60 is fixed to the housing 56 and does not rotate about the axis of rotation 42, when the brake plate 62 is in the engaged position 70, rotation of the brake plate 62 about axis of rotation 42 is ceased.

The magnetic unit 60 includes a coil 76 and a core section 78. The coil 76 radially surrounds the axis of rotation 42 and is configured to generate magnetic flux in response to being energized. The core section 78 radially surrounds the axis of rotation 42 and is attached to the housing 56 to retain the magnetic unit 60 thereto. The core section 78 may be formed from drawn steel that may be splined to the housing 56. The core section 78 partially surrounds the coil 76 to direct the flow of the magnetic flux therethrough. The core section 78 defines the grooves 64 therein. More specifically, the grooves 64 in the core section 78 may be formed as being integral to the core section 78 via stamping or drawing such that the grooves 64 serve as a torque interface to the corresponding teeth 66 of the brake plate 62. As such, the grooves 64 are not separately connected to the core section 78. Local heat treatment, e.g., carburizing, nitriding, etc., of the grooves 64 on the core section 78 may be used to strengthen the grooves 64.

The coil 76 is electrically connected to the energy storage system 30 and generates the magnetic flux in response to receiving current from the energy storage system 30. The magnetic flux generated by the coil 76 flows through the core section 78 and into the brake plate 62 to axially move the brake plate 62 into the engaged position 70 such that the teeth 66 engage the corresponding grooves 64 to cease rotation of the brake plate 62 about the axis of rotation 42, as shown in FIGS. 3 and 5.

Likewise, in an absence of the generation of magnetic flux by the coil 76, the brake plate 62 moves axially along the axis of rotation 42 to the disengaged position 68 such that the brake plate 62 is permitted to rotate about the axis of rotation 42, as shown in FIGS. 2 and 4.

Referring to FIGS. 2 and 3, the brake mechanism 58 also includes a biasing device 80 radially surrounding the axis of rotation 42. The biasing device 80 may be a return spring, such as a leaf spring, that radially extends between an inner portion 82 and an outer portion 84. The biasing device 80 is rotatably connected to the brake plate 62 at the outer portion 84 and to the input member 46 and the inner portion 82. By way of a non-limiting example, the biasing device 80 is connected to the brake plate 62 via rivets 86 which are non-ferrous. It should be appreciated that other forms of connection may also be used. The biasing device 80 is rotatable about the axis of rotation 42, in response to rotation of the brake plate 62 and the input member 46. Additionally, the biasing device 80 is axially restrained to the input member 46 at the inner portion 82, while the outer port of the biasing device 80 is axially movable along with the brake plate 62. More specifically, the biasing device 80 is resilient and is movable between a biased position 88, as shown in FIG. 3, and an unbiased position 90, as shown in FIG. 2. The brake plate 62 is in the engaged position 70 when the biasing device 80 is in the biased position 88 resulting from the generation of the magnetic flux. Likewise, in the absence of magnetic flux, the brake plate 62 is in the disengaged position 68 when the biasing device 80 is in the unbiased position 90. Due to resiliency, the biasing device 80 will automatically move to the unbiased position 90, in the absence of a force pulling the biasing device 80 to the biased position 88, i.e., the absence of magnetic of flux. More specifically, the biasing device 80 is naturally biased to move from the biased position 88 to the unbiased position 90 such that the brake plate 62 moves to the disengaged position 68 in the absence of the generation of magnetic flux. Additionally, a shim 92 may be axially disposed between the hub 50 and the inner portion 82 of the biasing device 80. The shim 92 may be formed from non-magnetic material that breaks a magnetic short circuit, if needed. The biasing device 80 is much more rigid in the radial direction than in the axial direction and, together with the bushing 72, is able to provide guidance to the brake plate 62, with a minimum of friction, as the brake plate 62 travels from the engaged position 70 to the disengaged position 68.

A bearing 94 is radially disposed between the input member 46 and the core section 78 such that the bearing 94 radially surrounds the axis of rotation 42. As such, the bearing 94 radially supports the input members 46, while still allowing rotation of the input member 46, relative to the core section 78, which is fixed to the housing 56. Arrangement of the bearing 94 directly between the core section 78 and the rotating input member 46 ensures a minimum number of parts, which contributes to the radial tolerance stack, i.e., variation of air gaps. Further, allowing these air gaps to be small improves the pull-in force on the brake plate 62.

The core section 78 has a cross-section which presents a base portion 96, a first wall 98, and a second wall 100. The base portion 96 extends in generally perpendicular relationship to the axis of rotation 42. Each of the first and second walls 98, 100 extends generally perpendicularly from the base portion 96 in spaced and parallel relationship to one another. The base portion 96, the first wall 98, and the second wall 100 cooperate to define a cavity 102 which radially surrounds the axis of rotation 42. The core section 78 is disposed in the cavity 102.

A ledge 104 extends generally perpendicularly from the second wall 100, radially away from the axis of rotation 42. A finger 106 extends generally perpendicularly from the ledge 104, axially away from the cavity 102. The ledge 104 defines the grooves 64 which extend in generally perpendicular relationship to the axis of rotation 42. The first wall 98 presents a first face 108 which extends in generally perpendicular relationship to the axis of rotation 42. Referring to FIGS. 3 and 5, the brake plate 62 contacts the first face 108 and the teeth 66 engage the corresponding grooves 64 of the ledge 104 when in the engaged position 70 such that there is an absence of an air gap between the core section 78 and the brake plate 62. The absence of an air gap between the brake plate 62 and the core section 78 allows the brake plate 62 to be held in the engaged position 70 with a low holding current. Further, the finger 106 overlaps with an outer edge 110 of the brake plate 62 when the brake plate 62 is in the engaged position 70 such that there is a radial air gap 112 shown in FIG. 6 defined between the finger 106 and the outer edge 110. The radial air gap 112 improves a pull-in force of the brake plate 62 to the engaged position 70.

Referring again to FIGS. 4 and 5, each of the teeth 66 may be V-shaped. Likewise, each of the grooves 64 may have a V-shape that is complimentary to the teeth 66 such that each groove 64 is configured to receive a corresponding one of the teeth 66. The V-shape allows for tangential engagement of a side 114 of each tooth 66 with a corresponding edge 116 of the groove 64. The tangential engagement also closes the air gap completely in a torque direction 118, allowing for a low holding current to maintain the brake plate 62 in the engaged position 70. The teeth 66 may be of other forms, including trapezoidal, U-shaped, rectangular, or combinations of these shapes.

Referring again to FIGS. 2 and 3, the brake plate 62 includes a first section 120, a second section 122, a third section 124, and a fourth section 126. The first section 120 extends in generally parallel relationship to the axis of rotation 42 and radially surrounds the bushing 72. The second section 122 radially extends in generally perpendicular relationship from the first section 120, radially away from the axis of rotation 42. The third section 124 extends from the second section 122 in generally parallel relationship to the axis of rotation 42 and to the first section 120. The third section 124 presents a first surface 128, facing radially opposite the axis of rotation 42. Likewise, the first wall 98 of the core section 78 presents a second surface 130, radially facing the axis of rotation 42. The third section 124 is spaced from the first wall 98 such that a small radial gap 132 is defined between the first surface 128 and the second surface 130. The small radial gap 132 provides an improved pull-in force to move the brake plate 62 into the engaged position 70, along with having low eccentricity and an unbalanced magnetic pull. The fourth section 126 radially extends in generally perpendicular relationship from the third section 124, radially away from the axis of rotation 42. The fourth section 126 includes a first segment 134 and a second segment 136, radially spaced from the first segment 134. A connecting portion 138 radially connects the first segment 134 to the second segment 136. The first segment 134, second segment 136, and the connecting portion 138 define a recess 140 axially facing the cavity 102 of the core section 78. The first segment 134 presents a second face 142, facing the first face 108. When the brake plate 62 is in the engaged position 70, the second face 142 contacts the first face 108 such that there is no air gap therebetween. Likewise, the second segment 136 presents the teeth 66, which engage the corresponding grooves 64 in the engaged position 70. When the brake plate 62 is in the engaged position 70, the magnetic flux generated by the coil 76 flows respectively through the first wall 98, the base portion 96, the second wall 100, the ledge 104, the finger 106, the second segment 136, the connecting portion 138, the first segment 134, the third section 124, and back into the first wall 98. Therefore, the brake mechanism 58 operates as a clutch that is electrically actuated. The reduced and/or zero air gaps provided in the engaged position 70 mean that the brake mechanism 58 operates with low power consumption. Therefore, the brake plate 62 is held in the engaged position 70 with minimized power consumption. The minimization of power consumption is assisted by reducing or eliminating the axial air gaps between the brake plate 62 and the core section 78 and between the sides 114 of the teeth 66 and the edges 116 of the grooves 64.

The brake plate 62 may be formed from stamped steel. The teeth 66 are formed integral to the brake plate 62 such that the teeth 66 are not separately connected to the brake plate 62. Local heat treatment, e.g., carburizing, nitriding, etc., of the teeth 66 on the brake plate 62 may be used to strengthen the teeth 66. Therefore, the second segment 136, including the teeth 66, may be hardened locally to prevent wear of the teeth 66 during engagement and disengagement from the grooves 64. Hardening only the teeth 66 means that the remainder of the brake plate 62 remains softer, providing improved magnetics.

Figure 6:
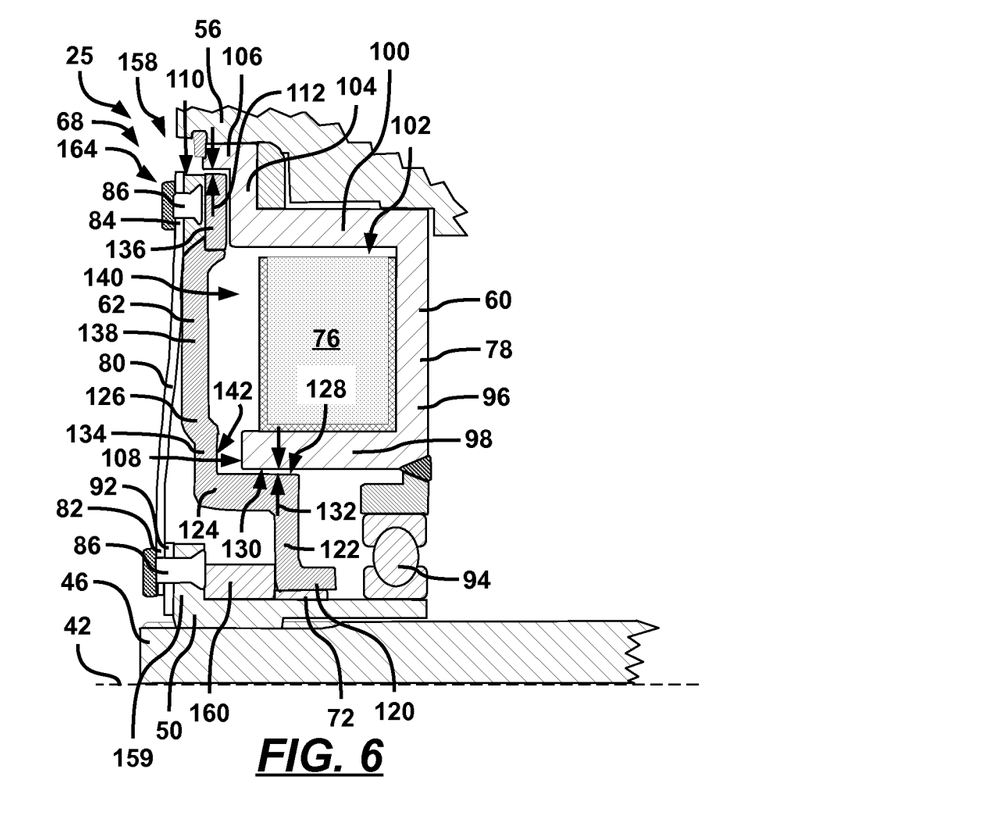
FIG. 6 is a schematic cross-sectional side view of the brake mechanism disposed in the hybrid transmission, with the brake mechanism in a disengaged position.
Figure 7:
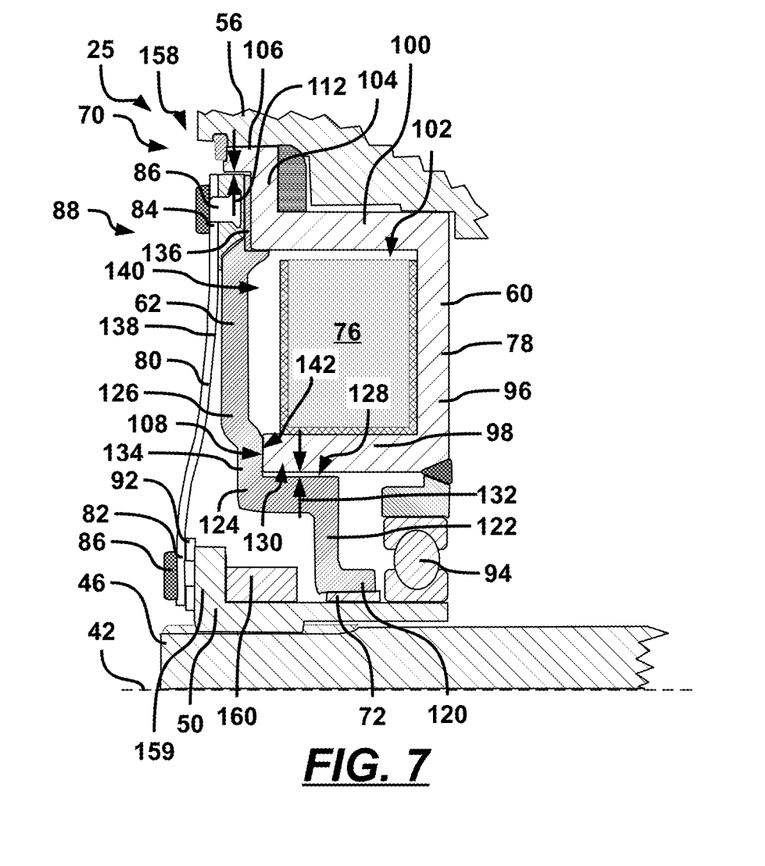
FIG. 7 is a schematic cross-sectional side view of the brake mechanism disposed in the hybrid transmission, with the brake mechanism in an engaged position.

Referring to FIGS. 6 and 7, an alternate embodiment of the brake mechanism 158 is shown. The brake mechanism 158 may further include a stop feature 160 which radially surrounds the hub 50. The hub 50 includes a radially extending lip 159. The stop feature 160 is axially disposed between the second section 122 of the core section 78 and the lip 159 to preload the biasing device 80 to avoid engagement of the brake plate 62 with the core section 78 due to shock or impact loads. More specifically, referring to FIG. 6, when the brake mechanism 158 is in the disengaged position 68, the preload feature prevents the brake plate 62 from completely being in the unbiased position, while instead maintaining a preload position 164 of the biasing device 80. This means that the outer portion 84 of the biasing device 80 is slightly displaced axially due to axial interference of the second section 122 of the brake plate 62 with the stop feature 160.

Figure 8:
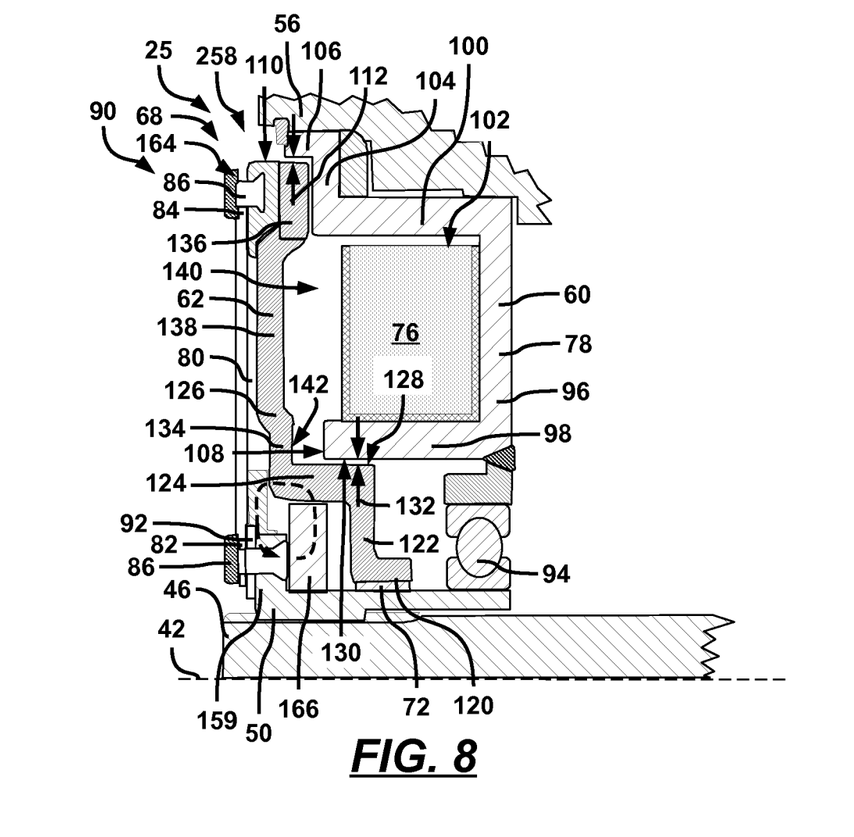
FIG. 8 is a schematic cross-sectional side view of the brake mechanism disposed in the hybrid transmission, with the brake mechanism in a disengaged position.
Figure 9:
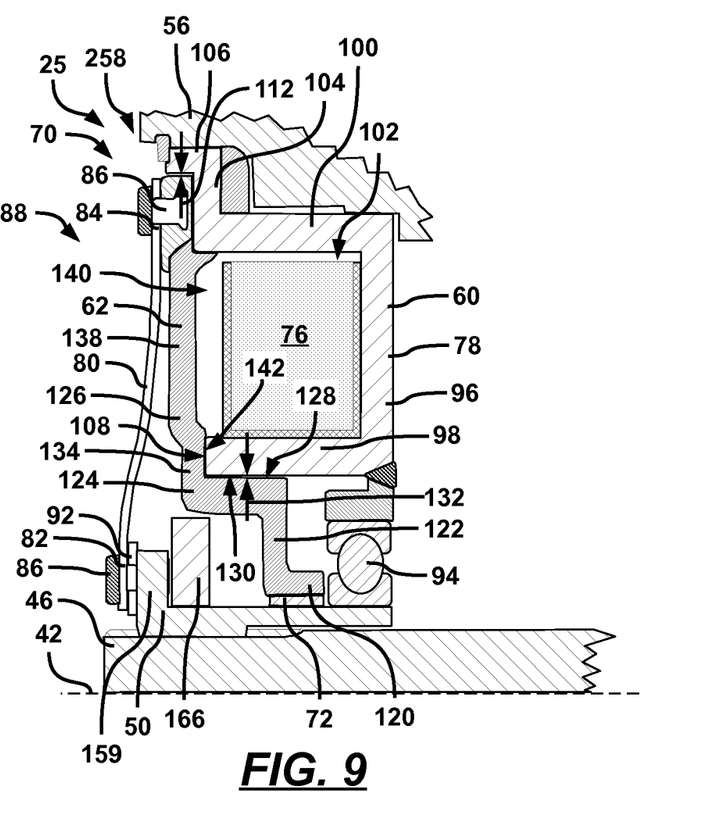
FIG. 9 is a schematic cross-sectional side view of the brake mechanism disposed in the hybrid transmission, with the brake mechanism in an engaged position.
Figure 10:
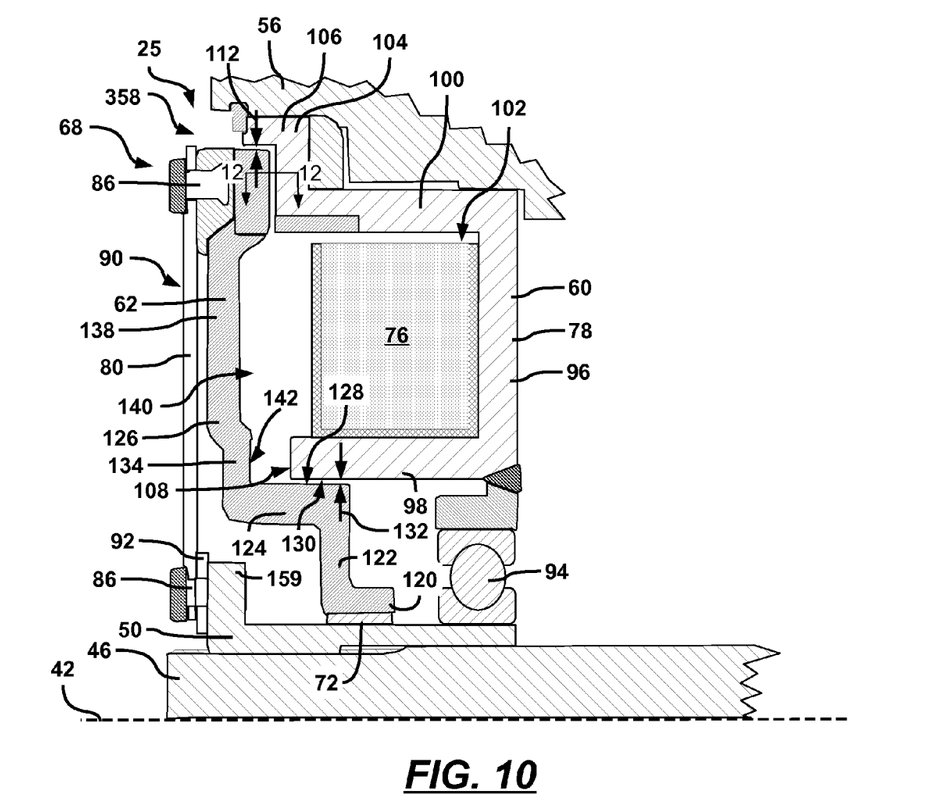
FIG. 10 is a schematic cross-sectional side view of the brake mechanism disposed in the hybrid transmission, with the brake mechanism in a disengaged position, taken along line 10-10 of FIG. 12.
Figure 11:
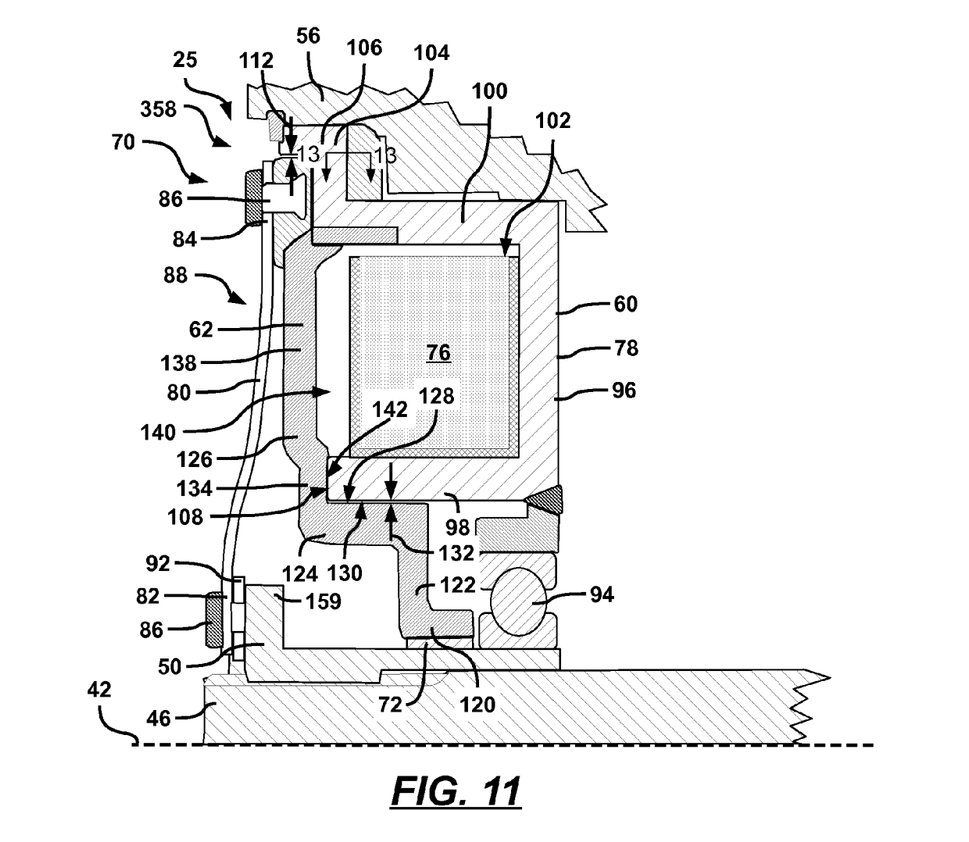
FIG. 11 is a schematic cross-sectional side view of the brake mechanism disposed in the hybrid transmission, with the brake mechanism in an engaged position, taken along line 11-11 of FIG. 13.
Figure 12:
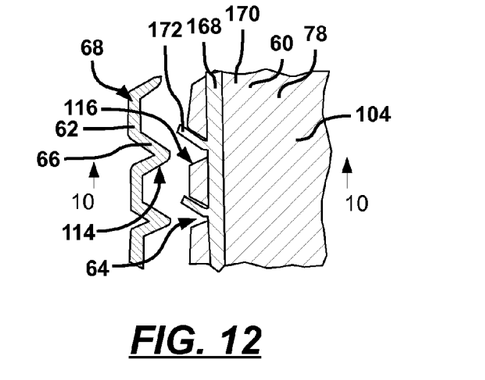
FIG. 12 is a schematic sectional view of the brake mechanism of FIG. 10 in the disengaged position, taken along line 12-12, illustrating the teeth of the braking plate in engagement with the grooves of the core section with flexible steel members disposed in the grooves.
Figure 13:
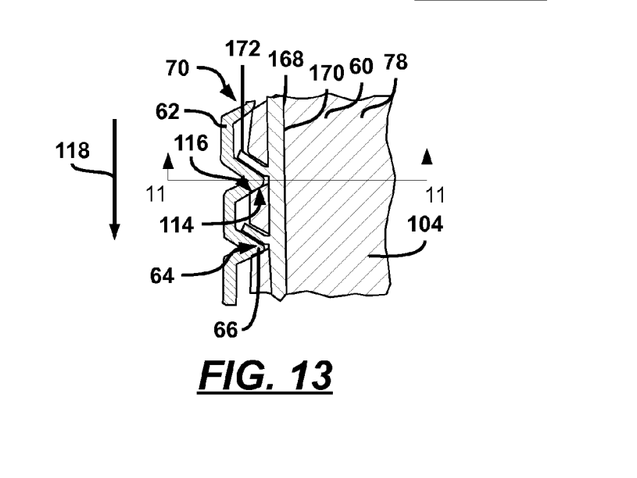
FIG. 13 is a schematic sectional view of the brake mechanism of FIG. 11 in the engaged position, taken along line 13-13, illustrating the teeth of a braking plate in engagement with the grooves of a core section with flexible steel members disposed in the grooves.

Referring to FIGS. 8 and 9 another embodiment of the brake mechanism 258 is shown. The brake mechanism 258 may include a magnet 166, such as a permanent magnet, axially disposed between the lip 159 of the hub 50 and the second section 122 of the brake plate 62. The magnet 166 provides a force to hold the brake plate 62 in the disengaged position 68 when the coil 76 is de-energized.

Referring to FIGS. 10-13, yet another embodiment of the brake mechanism 358 is shown. With specific reference to FIGS. 12 and 13, a spacer 168 is disposed in the ledge 104 of the core section 78. The spacer 168 may be a stamped steel component having a foundation 170 and flexible members 172 extending from the foundation 170. The foundation 170 is pressed into the ledge 104 such that the flexible members 172 flexibly extend into a corresponding groove 64, toward the teeth 66. The flexible members 172 ensure a closed magnetic path through the teeth 66 and the core section 78 when the sides 114 of the teeth 66 are not held firmly against the edges 116 of the grooves 64.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A brake mechanism for a hybrid transmission, the brake mechanism comprising:

a magnetic unit configured to selectively generate magnetic flux;

wherein the magnetic unit radially surrounds an axis of rotation and defines at least one groove;

a brake plate radially surrounding the axis of rotation;

wherein the brake plate includes at least one tooth and the brake plate is movable axially along the axis of rotation between a disengaged position and an engaged position;

wherein the brake plate is configured to rotate about the axis of rotation, relative to the magnetic unit, when in the disengaged position;

wherein the brake plate presents a first surface, facing radially opposite the axis of rotation;

wherein the magnetic unit presents a second surface, facing the axis of rotation and radially opposing the first surface, such that the first surface is in radially spaced relationship to the second surface to define a radial air gap therebetween; and wherein the at least one tooth of the brake plate is configured to engage a corresponding at least one groove of the magnetic unit when in the engaged position in response to generation of magnetic flux by the magnetic unit to prevent rotation of the brake plate.

2. The brake mechanism, as set forth in claim 1, wherein the at least one groove is further defined as a plurality of grooves radially surrounding the axis of rotation;
 wherein the at least one tooth is further defined as a plurality of teeth radially surrounding the axis of rotation; and
 wherein the plurality of teeth are radially disposed to be axially alignable with the plurality of grooves when the brake plate is in the engaged position such that the plurality of teeth are engaged by the corresponding plurality of grooves.

3. The brake mechanism, as set forth in claim 2, wherein each of the plurality of teeth is V-shaped; and
 wherein each of the plurality of grooves is V-shaped such that each of the grooves is configured to receive a corresponding one of the teeth.

4. The brake mechanism, as set forth in claim 1, wherein the magnetic unit includes:
 a coil radially surrounding the axis of rotation and configured to generate magnetic flux in response to being energized;
 a core section radially surrounding the axis of rotation and configured for attachment to a housing of the hybrid transmission to retain the magnetic unit to the housing;
 wherein the core section partially surrounds the coil to direct a flow of the magnetic flux therethrough;
 wherein the core section defines the at least one groove and presents the second surface; and
 wherein magnetic flux generated by the coil flows through the core section and into the brake plate to axially move the brake plate into the engaged position such that the at least one tooth engages the at least one groove to prevent rotation of the brake plate about the axis of rotation.

5. The brake mechanism, as set forth in claim 4, wherein the brake plate is configured to move axially along the axis of rotation to the disengaged position in response to an absence of the generation of magnetic flux by the coil such that the brake plate can rotate about the axis of rotation; and
 the brake plate including:
  a first section, a second section, and a third section;
  wherein the first section extends in generally parallel relationship to the axis of rotation;
  wherein the second section extends in generally perpendicular relationship from the first section, radially away from the axis of rotation;
  wherein the third section extends from the second section in generally parallel relationship to the axis of rotation and to the first section; and
  wherein the third section presents the first surface, facing radially opposite the axis of rotation.

6. The brake mechanism, as set forth in claim 5, further comprising a biasing device radially surrounding the axis of rotation and rotatably connected to the brake plate and configured to be rotatably connected to the hybrid transmission;
 wherein the biasing device is movable between a biased position and an unbiased position;
 wherein the brake plate is in the engaged position when the biasing device is in the biased position;
 wherein the brake plate is in the disengaged position when the biasing device is in the unbiased position; and
 wherein the biasing device is biased to move from the biased position to the unbiased position such that the brake plate moves to the disengaged position in the absence of the generation of magnetic flux.

7. The brake mechanism, as set forth in claim 5, wherein the core section has a cross-section presenting a base portion, a first wall, and a second wall;
 wherein the base portion extends in a generally perpendicular relationship to the axis of rotation;
 wherein each of the first and second walls extends generally perpendicularly from the base portion in spaced relationship to one another;
 wherein the base portion, the first wall, and the second wall cooperate to define a cavity radially surrounding the axis of rotation;
 wherein the coil is disposed in the cavity;
 wherein the first wall presents the second surface and a first face;
 wherein the brake plate presents a second face opposing the first face; and
 wherein when the brake plate is in the engaged position, the first face contacts the second face such that there is an absence of an air gap between the core section and the brake plate.

8. The brake mechanism, as set forth in claim 7, wherein the core section further includes:
 a ledge extending generally perpendicularly from the second wall and radially away from the axis of rotation;
 wherein the ledge defines the at least one groove;
 a finger extending generally perpendicularly from the ledge and axially away from the cavity;
 wherein the first wall presents the first face extending in generally perpendicular relationship to the axis of rotation; and
 wherein the finger overlaps with an outer edge of the brake plate when the brake plate is in the engaged position such that a radial air gap is defined between the finger and the outer edge of the brake plate to improve a pull-in force of the brake plate into the engaged position.

9. The brake mechanism, as set forth in claim 8, further comprising:
 a spacer extending from the ledge;
 wherein the spacer includes a foundation and a flexible member extending from the foundation;
 wherein the flexible member flexibly extends into the at least one groove, toward the at least one tooth such that the flexible member ensures a closed magnetic path through the at least one tooth and the core section when the at least one tooth is not held firmly against the at least one groove.

10. The brake mechanism, as set forth in claim 4, further comprising a bearing radially surrounded by the core section such that the bearing radially surrounds the axis of rotation;
 wherein the bearing is configured to radially support the core section relative to the axis of rotation.

11. A hybrid transmission comprising:
 an input shaft rotatable about an axis of rotation;
 at least one electric motor/generator;
 a gear set rotatable about the axis of rotation;
 a brake mechanism operatively attached to the input shaft, the brake mechanism including:
  a magnetic unit configured to selectively generate magnetic flux;
  wherein the magnetic unit radially surrounds the axis of rotation and defines at least one groove;
  a brake plate radially surrounding the axis of rotation;
  wherein the brake plate includes at least one tooth and the brake plate is movable axially along the axis of rotation between a disengaged position and an engaged position;
  wherein the brake plate is configured to rotate about the axis of rotation, relative to the magnetic unit, when in the disengaged position;

wherein the brake plate presents a first surface, facing radially opposite the axis of rotation;

wherein the magnetic unit presents a second surface, facing the axis of rotation and radially opposing the first surface, such that the first surface is in radially spaced relationship to the second surface to define a radial air gap therebetween; and wherein the at least one tooth of the brake plate is configured to engage a corresponding at least one groove of the magnetic unit when in the engaged position in response to generation of magnetic flux by the magnetic unit to cease rotation of the brake plate.

12. The hybrid transmission, as set forth in claim 11, wherein the at least one groove is further defined as a plurality of grooves radially surrounding the axis of rotation;

wherein the at least one tooth is further defined as a plurality of teeth radially surrounding the axis of rotation; and wherein the plurality of teeth are radially disposed to be axially alignable with the plurality of grooves when the brake plate is in the engaged position such that the plurality of teeth are engaged by the corresponding plurality of grooves.

13. The hybrid transmission, a set forth in claim 12, wherein each of the plurality of teeth is V-shaped; and wherein each of the plurality of grooves is V-shaped such that each of the grooves is configured to receive a corresponding one of the teeth.

14. The hybrid transmission, as set forth in claim 11, wherein the magnetic unit includes:

a coil radially surrounding the axis of rotation and configured to generate magnetic flux in response to being energized;

a core section radially surrounding the axis of rotation and configured for attachment to a housing of the hybrid transmission to retain the magnetic unit to the housing;

wherein the core section partially surrounds the coil to direct a flow of the magnetic flux therethrough;

wherein the core section defines the at least one groove and presents the second surface; and wherein magnetic flux generated by the coil flows through the core section and into the brake plate to axially move the brake plate into the engaged position such that the at least one tooth engages the at least one groove to prevent rotation of the brake plate about the axis of rotation.

15. The hybrid transmission, as set forth in claim 14, wherein the brake plate is configured to move axially along the axis of rotation to the disengaged position in response to an absence of the generation of magnetic flux by the coil such that the brake plate can rotate about the axis of rotation; and the brake plate including:
a first section, a second section, and a third section;
wherein the first section extends in generally parallel relationship to the axis of rotation;
wherein the second section extends in generally perpendicular relationship from the first section, radially away from the axis of rotation;
wherein the third section extends from the second section in generally parallel relationship to the axis of rotation and to the first section; and
wherein the third section presents the first surface, radially facing the axis of rotation.

16. The hybrid transmission, as set forth in claim 15, further comprising a biasing device radially surrounding the axis of rotation and rotatably connected to the brake plate and configured to be rotatably connected to the hybrid transmission;

wherein the biasing device is movable between a biased position and an unbiased position;

wherein the brake plate is in the engaged position when the biasing device is in the biased position;

wherein the brake plate is in the disengaged position when the biasing device is in the unbiased position; and wherein the biasing device is biased to move from the biased position to the unbiased position such that the brake plate moves to the disengaged position in the absence of the generation of magnetic flux.

17. The hybrid transmission, as set forth in claim 14, further comprising a bearing radially surrounded by the core section such that the bearing radially surrounds the axis of rotation;

wherein the bearing is configured to radially support the core section relative to the axis of rotation.

18. The hybrid transmission, as set forth in claim 15, wherein the core section has a cross-section presenting a base portion, a first wall, and a second wall;

wherein the base portion extends in a generally perpendicular relationship to the axis of rotation;

wherein each of the first and second walls extends generally perpendicularly from the base portion in spaced relationship to one another;

wherein the base portion, the first wall, and the second wall cooperate to define a cavity radially surrounding the axis of rotation;

wherein the coil is disposed in the cavity;

wherein the first wall presents the second surface and a first face;

wherein the brake plate presents a second face opposing the first face; and wherein when the brake plate is in the engaged position, the first face contacts the second face such that there is an absence of an air gap between the core section and the brake plate.

19. The hybrid transmission, as set forth in claim 18, wherein the core section further includes:

a ledge extending generally perpendicularly from the second wall and radially away from the axis of rotation;

wherein the ledge defines the at least one groove;

a finger extending generally perpendicularly from the ledge and axially away from the cavity;

wherein the first wall presents the first face extending in generally perpendicular relationship to the axis of rotation; and wherein the finger overlaps with an outer edge of the brake plate when the brake plate is in the engaged position such that a radial air gap is defined between the finger and the outer edge of the brake plate to improve a pull-in force of the brake plate into the engaged position.

20. The hybrid transmission, as set forth in claim 18, further comprising:

a spacer extending from the ledge;

wherein the spacer includes a foundation and a flexible member extending from the foundation;

wherein the flexible member flexibly extends into the at least one groove, toward the at least one tooth such that the flexible member ensures a closed magnetic path through the at least one tooth and the core section when the at least one tooth is not held firmly against the at least one groove.

* * * * *